Nov. 24, 1936.  P. S. MARTIN  2,061,712
BROODER
Filed Feb. 7, 1931  6 Sheets-Sheet 1

Inventor
Perry S. Martin
By H. H. Snelling
Attorney

Nov. 24, 1936.  P. S. MARTIN  2,061,712
BROODER
Filed Feb. 7, 1931  6 Sheets-Sheet 3

Nov. 24, 1936.  P. S. MARTIN  2,061,712
BROODER
Filed Feb. 7, 1931  6 Sheets-Sheet 4

Inventor
Perry S. Martin
By H. H. Snelling
Attorney

Nov. 24, 1936.  P. S. MARTIN  2,061,712
BROODER
Filed Feb. 7, 1931   6 Sheets-Sheet 6

Inventor
Perry S. Martin
By H. H. Snelling
Attorney

Patented Nov. 24, 1936

2,061,712

UNITED STATES PATENT OFFICE 2,061,712

BROODER

Perry S. Martin, Harrisonburg, Va.

Application February 7, 1931, Serial No. 514,272

23 Claims. (Cl. 119—31)

This invention appertains to brooder houses for poultry and has for one of its primary objects the provision of novel means for arranging a maximum number of nursery brooder units in a minimum amount of floor space in a brooder house, without sacrificing any of the advantages of the brooder house and to still give ample room for the attendant to perform the necessary duties in the brooder house.

A further object of this invention is to provide communicating brooding chambers having heating and ventilating means arranged to provide a rapid circulation of the air in each chamber and thereby form a relatively large brooding zone of substantially uniform temperature in each chamber, with the temperature of said brooding zones being of different degrees and communicating brooding units located in said zones.

Another important object of my invention is the provision of a brooder house having a plurality of nursery brooder units arranged in each room thereof, the brooder units being arranged in tiers and the tiers separated to form aisles, each tier of the nursery brooder units including two vertical stacks of said units, and the units of one stack having communication with the units of another stack, the rooms being divided at the aisle portions by vertical curtains at the meeting points of the stacks of the nursery brooder units with the heating means for the house being arranged in the rooms solely on one side of the curtains and at one end of the tiers, whereby the stacks on one side of the curtains will be maintained at a warmer temperature than the stacks on the other side of the curtains thereby allowing the chicks to seek the temperature desired, thus insuring the proper growth and feathering of the chicks and the healthy and normal propagation thereof.

A further important object of my invention is to permit the flow of heat from the portion of the brooder room containing the heater into the portion of the room not containing the heater, the warm air circulating through the brooder units between the curtains dividing the rooms, while a certain amount of heat passes through the curtain.

A further salient object of my invention is the provision of novel means for properly ventilating each portion of the brooder room independently of the other, so as to insure of the maintenance of the proper and correct temperature in each portion of the brooder room, independent thermostat control means being provided for governing the escape of the heated air from each portion of the brooder room.

A further object of my invention is the provision of novel means for constructing the nursery brooder units, whereby the units can be readily arranged one upon the other to form the tiers and still permit the proper and necessary circulation of air therethrough, the units being of such a construction as to permit the units of one stack to have connection of the units of another stack to allow the chickens access from the units of one stack to the units of the adjacent stack.

A further object of my invention is the provision of novelly arranged screen floors or lower walls for each brooder unit so as to permit the circulation of air through the floors of the units and to allow the chicken droppings to pass through the brooder floors so as to maintain the same in a cleanly condition, the brooder floors being freely removable to permit the necessary cleaning.

A further object of the invention is the provision of trays slidably associated with the bottom of the nursery brooder units below the screen floors thereof for receiving the droppings from the floors, whereby the droppings will be prevented from going from one nursery brooder to the nursery brooder below the same, the pans permitting the quick removal of the droppings from the nursery units.

A further object of my invention is the provision of novel means for constructing the brooder units to permit the quick and detachable association of feed hoppers and water troughs thereof, the feed hoppers and water troughs being provided with a novel adjustable gate which can be regulated according to the size of the chicks, said feed hoppers and water troughs also being constructed and arranged with respect to the brooder units that the main reservoirs for feed and water are arranged exteriorly of the units, while the area of access to the hoppers and troughs are arranged interiorly of the units, in order to provide maximum feeding and watering areas having no obstruction thereto.

A still further object of my invention is the provision of brooder units constructed from structural iron units, whereby the brooder sections or units can be easily assembled and maintained in a sanitary and clean condition at all times.

With these and other objects in view, the invention consists in the novel construction, arrangement and formation of parts, as will be hereinafter more specifically described, claimed, and illustrated in the accompanying drawings, in which drawings:

Figure 2 is a fragmentary horizontal section through the brooder house taken on the line 2—2 of Figure 1 looking in the direction of the arrows and illustrating the rooms formed in the brooder house and the arrangement of the tiers of brooder units in the rooms;

Referring to the drawings in detail, wherein similar reference characters designate corresponding parts throughout the several views, the letter A generally indicates a brooder house and B the nursery brooder units.

The brooder house A is preferably built on a concrete or similar foundation 15 so as to space the lower end of the house from the ground and this foundation 15 includes front, rear and end foundation walls and a centrally disposed longitudinally extending foundation wall 16. The floor joists 17 preferably extend transversely of the building and rest on the front and rear foundation walls and the central wall 16. The joists 17 do not extend entirely across the building, but have their inner ends resting upon the central foundation wall 16 and the joists are arranged in spaced relation to form air channelways 18 therebetween. The front, rear and end walls of the house can be constructed in any desired way, but I prefer that these walls be constructed so as to effectively insulate the interior of the house from outside atmospheric conditions and that the walls be provided with ample windows 18' so as to insure the admittance of proper light and sun into the house. The roof rafters 19 are inclined downwardly from the longitudinal center of the building and are braced by beams 20 with the ceiling joists 21 and these joists 21 have secured thereto a suitable ceiling 22. Any desired type of roof 23 can be laid upon the rafters 19. A floor 24 is connected to the floor joists in any desired way.

The building A is preferably divided into different rooms 25 by transverse partitions 26 and these partitions can be provided with door openings 27 to permit access to be had from one room to another.

In each room 25 I provide tiers 28 of brooder units 29 and the tiers are spaced to provide aisles 30. Each tier 28 includes a plurality of superposed units 29 stacked one upon another forming a plurality of decks of brooder units and as many decks of the brooder units 29 can be used as is necessary or desirable, and I prefer to provide each tier of two stacks of brooder units, one stack of brooder units being indicated by the reference character 31 and the other stack by the reference character 32 and the stacks 31 and 32 are placed with their ends abutting so that the chicks may have free access from the brooder unit of one deck to the brooder unit of the same deck in the adjacent stack, for a purpose which will be more fully described.

At the point of connection of the stacks 31 and 32 with one another, the aisles 30 are separated by curtains 33 dividing each room 25 into substantially independent room portions 34 and 35. These curtains 33, which are preferably flexible, are arranged substantially at the longitudinal center of the building A and can be attached at their upper ends to the ceiling 22, while their lower ends are left free so that persons can go from one room portion down the aisle to another room portion. The lower ends of the curtains 33 can be provided with a weight strip or the like 36.

The tiers 28 of brooder units 29 are preferably placed upon suitable benches 37 so as to space the same from the floor 24 and thus prevent the cool floor air from coming into contact with the lowermost deck of brooder units. However, the tiers can be suspended from the ceiling if it is not desired to use the benches 37 and in fact the tiers can be arranged in any desired manner in the room.

At this point, it is also well to note that the tiers terminate short of the front of the building to provide a longitudinal passageway for the attendant and are spaced from the rear wall to provide a space for the heating device.

The heating device includes longitudinally extending radiator sections 40 which are arranged adjacent to the floor 24 and the rear wall of the building. As shown the radiator sections are disposed at an angle to the horizontal and are provided with feed and return pipes 41 and 42 which can lead to any desired type of furnace or boiler, which can be centrally disposed in the brooder house. In each room 25 and in the heat supply pipes to the radiators 40 are arranged valves 41a which are controlled by thermostatic regulators 75

42ª for controlling the flow of heat to each radiator.

The brooder units 29 are preferably formed of foraminous material so as to permit the free circulation of air therethrough and it is to be noted that I provide a novel circulation of air through the brooder house and for each room and for the room portions 34.

Thus, in accordance with my invention I provide air intake members 43 and 44 at the front and rear of the building above the foundation 15 and below the floor 24. The air intake permits the entrance of air into the channelways between the floor joists 17 and the floors 24 in the room portions 34 can be provided with air intake ports 45 below the brooder tiers and these air intake ports can be covered by suitable screening or the like 46. As shown, the air intakes are preferably arranged below and at the central portion of the stacks 31 of the tiers 28 of brooder units 29. Substantially at the central portion of each room portion, the ceiling 22 is provided with air outlets 47 and these air outlets are staggeredly arranged relative to the air intakes 45 and preferably disposed above the aisles 30. Thermostatically controlled dampers 48 are provided for each outlet 47 in each room portion so that the circulation of air can be controlled independently in each room portion 34 and 35, as is desirable and which forms an important feature of my present invention. The roof 23 is provided with a suitable ventilator 49, which communicates with the building above the ceiling 22 and allows the exit of the air from the building or house.

The temperature range found best for chicks is from 70° to 90° so that I set the thermostats 42ª and 48 (right hand) to give a temperature of about 85° F. at the right edge of stacks 32; the temperature difference between the top and bottom of the stacks at this end will then be about 2° F. The left thermostat 48 is set to provide a temperature of about 70° at the left hand end of stacks 31, the temperature difference between the top and bottom of the stacks at this end is then from 5° to 8° F.

While I have explained a particular brooder house with a particular ventilating system, it is to be understood that the brooder tiers 28 formed by the brooder units 29, which form an essential part of this invention, can be arranged in a brooder house illustrated and described in my pending application, Serial No. 246,799, filed January 14, 1928, now Patent No. 1,995,213 issued March 19, 1935.

As each brooder unit 29 is constructed identically the same, only one brooder unit will be described in detail, but I provide a novel means for connecting the brooder unit of one stack in one deck with the brooder unit in the same deck of the adjacent stack and this means will also be fully described. The brooder units 29 are preferably constructed from foraminous material and a structural iron framework and include corner angle iron standards 50, which are connected together at their upper ends by longitudinally extending angle iron rails 51 and 52 and end transversely extending angle iron rails 53. These rails are connected together and to the standards 50 by the use of corner reinforcing plates 54 which are of a substantial triangular configuration and are provided with upstanding side and end flanges 55, which constitute stops and seats for the adjacent deck or units placed thereon.

At the front and rear of each brooder unit I can provide upstanding reinforcing plates 56, which are secured to the front and rear longitudinally extending angle bar rails 51 and 52. These plates 56 are preferably equi-distantly spaced from one another and from the corner standards 50 and these plates are connected together at their lower ends by transversely extending channel iron members 57 and it is to be noted that the channel iron members 57 are used in pairs and disposed in abutting relation with their flanges turned outward, for a purpose which will be later described. The corner standards 50 are connected at their lower ends by a single transversely extending channel iron member 58 which has its flanges turned inwardly and thus the flanges of the channel iron members 57 and 58 form guides for removable dropping trays 59 which will be more fully described. It is to be noted that the lower ends of the front plates 56 are cut away on each side of the channel bars 57 so as to allow the trays 59 to be freely slid into the flanges of said channel beams. This construction is also true of the front corner standards at their lower ends.

Extending longitudinally of the brooder units at the front and rear thereof, are provided longitudinally extending metal floor seats 60 and 61 which can be secured to the corner standards and the intermediate plates 56, and these members 60 and 61 form not only a seat for the floor members, as will be later described, but also form means for bracing the lower ends of the brooder units. Each one of the longitudinally extending floor supporting members 60 and 61 includes a relatively wide base flange 62, arranged in a horizontal plane, an upstanding end wall flange 63 and a top inclined flange 64 of less width than the bottom flange. These longitudinally extending members 60 and 61 are secured to and tend to support the channel beams 57 and 58 and are likewise secured to the corner standards 50 and the side plates 56. These members 60 and 61 tend to prevent buckling of the brooder units longitudinally while the channel beams 57 tend to prevent buckling of the units transversely.

As intimated, the members 60 and 61 removably support the floor sections 65 for the brooder units and I prefer to provide three floor sections for each unit and these floor members occupy the space between the corner standards and the intermediate plates 56 and the same rest upon the bottom flanges 62 of said members. The floor sections 65 are of a less width than the distance between the members 60 and 61, so that the floor sections can be pushed inwardly to their full extent into the member 61 and then lifted or swung at an angle at its opposite end past the inclined flange 64, after which the floor sections can be tilted and removed from the brooder units for cleaning purposes.

The uppermost brooder units of the tiers or stacks 28 and 29 are provided with tops 66 of mesh material, each supported in a suitable metallic frame including end members 67 which are bent about the ends of the mesh material. The frames also include metallic side pieces 68 which are bent about the longitudinal edges of the mesh material and are secured to the member 67. The side pieces 68 are also provided with the upstanding flanges 69 for preventing flexing of the tops. The upstanding flanges 55 and the corner plates 54 will hold the top in their desired positions.

The floor sections 65 are held on the longitudinal brace members 60 and 61 against movement by novel reinforcing and lock plates 70 which extend across the brooder units at the point of juncture of the floor sections, and these lock plates form means for bridging the floor sections so the chicks can travel from one floor section to the other without difficulty. As shown, the lock plate 70 includes a longitudinally extending body 71 bowed transversely so as to extend over the flanges 69 and one end of the body portion of the lock plate is provided with an upstanding lip 72 for engaging under the inclined flange 64 of the longitudinally extending brace member 61, while the opposite end of the body of the lock plate is provided with an upwardly and outwardly inclined arm 73 having an angularly extending foot 74 for extending under a holding clip 75 riveted or otherwise secured to the intermediate brace plate 56. The lock plate 70 can be readily removed by sliding the arm 73 from out of engagement with the foot and then pulling the same upwardly and away from the flange 64. This lock plate can be made of resilient material in order to facilitate the connection of the arm 73 with the clip 75.

The tops of the brooder units are preferably left open so that the chicks can be dropped from one brooder unit to another brooder unit below the same and the outer end walls of the brooder units can be closed by foraminous screens 76 which can be secured to the end top angle iron 53 and to the corner standards at their ends.

The inner ends of the brooder sections can be closed, when desired, by swinging doors or cover plates 77 and these plates are hingedly connected together as at 78 to permit one plate to be swung upon the other and the uppermost plate is hingedly connected as at 79 to the lower edge of the end top transversely extending angle bar 59 so that the plate can be swung up against said end channel bar when necessary or desirable.

I associate with each brooder unit feed hoppers 80 and watering troughs 81 and it is to be noted that I prefer to arrange the feeding troughs 80 on the brooder unit adjacent to the opposite ends thereof with the watering troughs 81 intermediate the feed troughs, and these troughs are detachably associated with the unit in a novel manner, as will now be described.

The feed troughs 80 are of a substantially triangular shape in cross section and include inclined bottom walls 82 and 83 and the wall 82 is of a less length than the wall 83 and a longitudinally extending partition plate 84 is arranged in the hopper in relative close proximity to the wall 82 and the inner side of the trough so as to form a relatively large compartment exteriorly of the unit for receiving the feed, while the compartment 86 on the opposite side of the partition plate 84 and arranged interiorly of the unit constitutes the space from which the chicks can feed and the feed will gravitate from the chamber 85 below the partition plate 84 into the chamber 86. The inclination of the wall 82 corresponds to the inclination of the flange 64 of the longitudinally extending, brace members 60 and 61 and this wall rests upon said flange and can be detachably connected therewith by down turning the forward edge of the wall 82, as at 87. Arranged on the inner surface of the wall 82 is an adjustable plate 82$^a$ provided with upstanding end flanges 82$^b$ and front flange 82$^c$. The plate 82$^a$ is slotted transversely at the center thereof as at 82$^d$ and a threaded bolt 82$^e$ carried by the wall 82 extends therethrough, while a wing nut 82$^f$ is threaded on the bolt and is adapted to hold the plate 82$^a$ in an adjusted position on the wall 82$^a$. By providing the adjustable plate 82$^a$ on the feed hopper the same may be adjusted to its lowermost position when chicks are first placed in the brooding units and as the chicks grow the plate can be conveniently adjusted to higher positions to prevent chicks raking or scratching feed from hopper.

Above the feeder troughs I provide swinging grates 88 which can be hingedly connected with the top longitudinally extending angle iron members or rails 52 and these rails are preferably provided with upturned flanges 52' at their lower edges so as to prevent the forming of sharp cutting surfaces which would be liable to injure the arm of the attendant when the grate is swung back for handling the chicks and cleaning the units. The longitudinally extending bars 89 forming a part of the grate 88 extend beyond the sides of the corner standards and intermediate plates 56, so as to prevent the forward swinging of the grate.

The drinking trough includes a bottom wall 90 and a forwardly and upwardly inclined inner wall 91 which is adapted to rest on the flange 64 of the longitudinally extending members 60 and 61 and the inclined wall has the forward edge thereof bent, as at 92, for hooking thereover which supports the drinking trough in place. The units above the drinking trough are likewise provided with swinging grates 93 which carry at their lower ends plates 94 and 94$^a$ which can be placed in different position in the drinking fountain or trough so as to regulate the distance which the chickens can gain access into the water pan, the plates 94 and 94$^a$ being moved back as the chickens mature. The plate 94$^a$ is adjustably carried by the plate 94 and can be moved vertically on the plate 94 for increasing or decreasing the access area of the trough. This is very essential as small chicks often drown when the access area is too great. The plate 94 is slotted as at 94$^b$, transversely and at the center thereof, while the plate 94$^a$ is apertured for receiving a threaded bolt 94$^c$ which also extends through the slot 94$^b$, and has a wing nut 94$^d$ threaded thereon for holding the plates in adjusted positions. For aiding in slidably adjusting the plates 94 and 94$^a$ and for holding the ends thereof together the plate 94$^a$ has its opposite ends bent back as at 94$^e$ for providing recesses into which the ends of the plate 94 are slidably received. The bolt 94$^c$ is carried by an arm 94$^f$ which is held to the plate 94 when the wing nut 94$^d$ is tightened. An angled extension 94$^g$ is provided on the end of the arm 94$^f$ for engaging the forward edge of the inner wall 91 of the water trough to prevent outward swinging movement of the plates 94 and 94$^a$ past certain adjusted positions.

Figures 1, 12, 13:
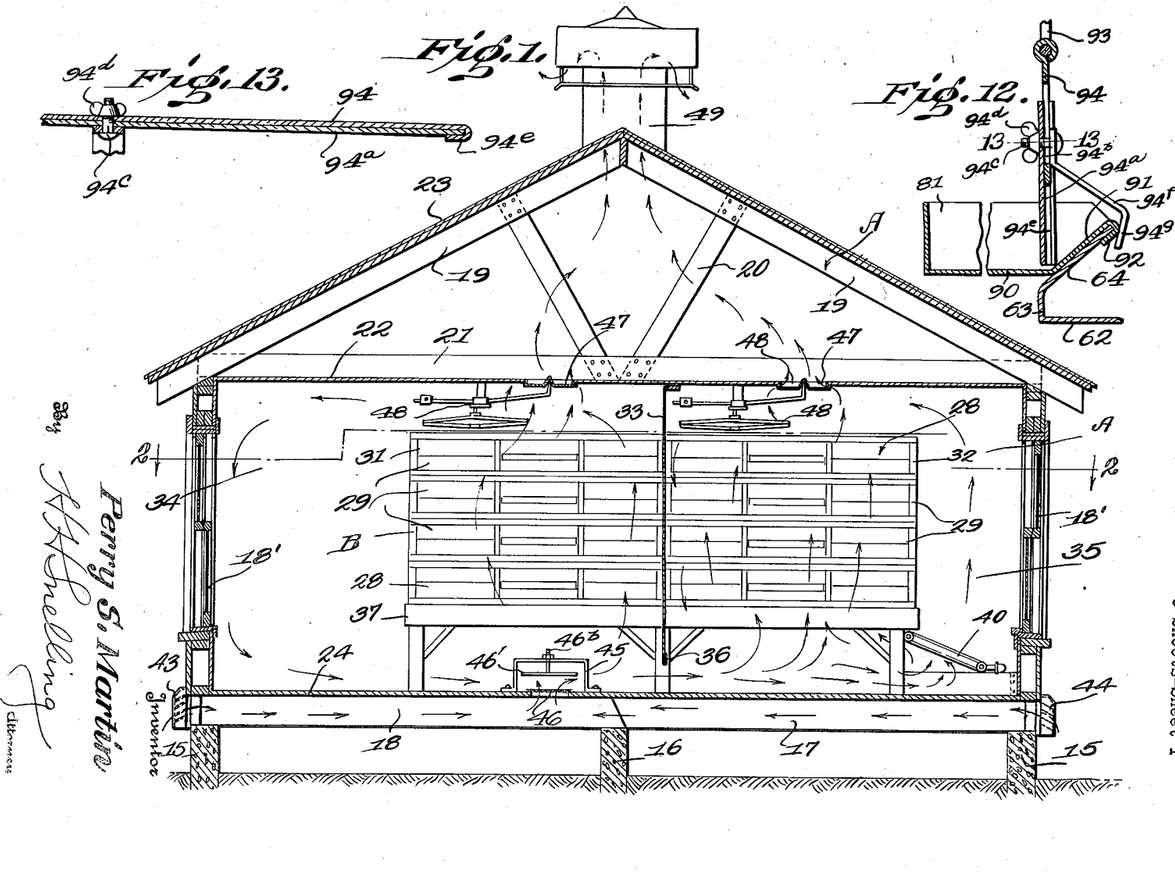
Figure 1 is a vertical transverse section on the line 1—1 of Figure 2 through my novel brooder house illustrating the arrangement of my nursery units therein.
Figure 12 is a similar enlarged cross section through a water trough taken on the line 5—5 of Figure 3.
Figure 13 is a detailed section taken on line 13—13 of Figure 12.
Figure 3:
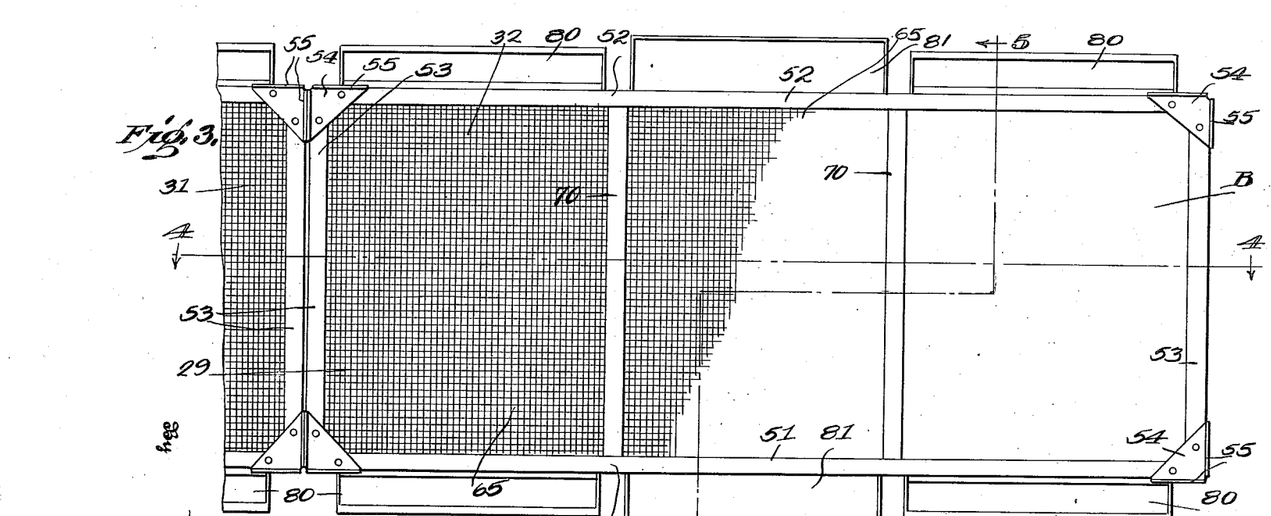
Figure 3 is a fragmentary top plan view of one of the tiers of brooder units, the tops being omitted.
Figure 4:
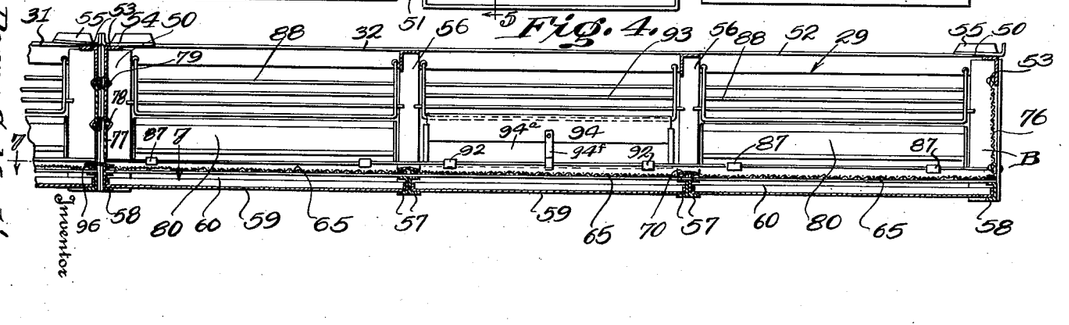
Figure 4 is a longitudinal section taken on the line 4—4 of Figure 3 looking in the direction of the arrows illustrating the means of connecting one brooder unit in one stack of a tier of brooder units with a brooder unit of another stack in the tier.
Figure 5:
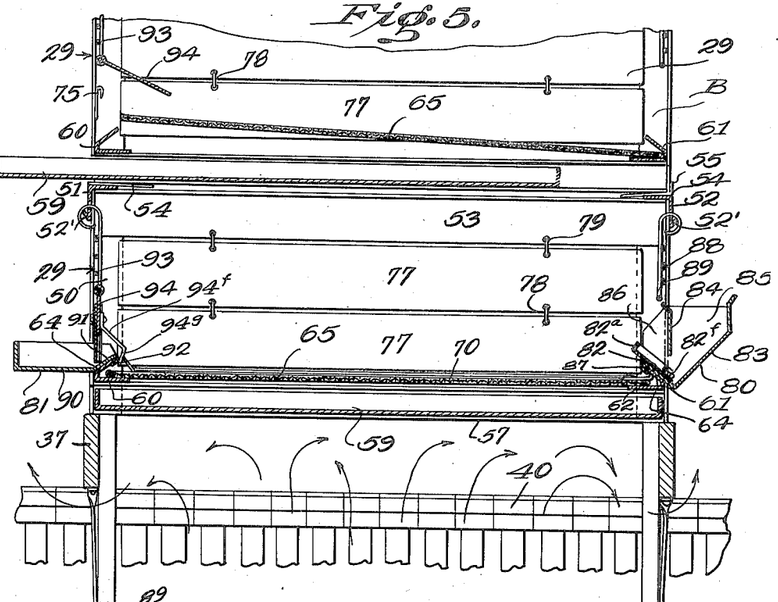
Figure 5 is a transverse section through a tier of the brooder units taken on the line 5—5 of Figure 3 looking in the direction of the arrows, the upper end of the tier of brooder units being broken away.
Figures 6, 11:
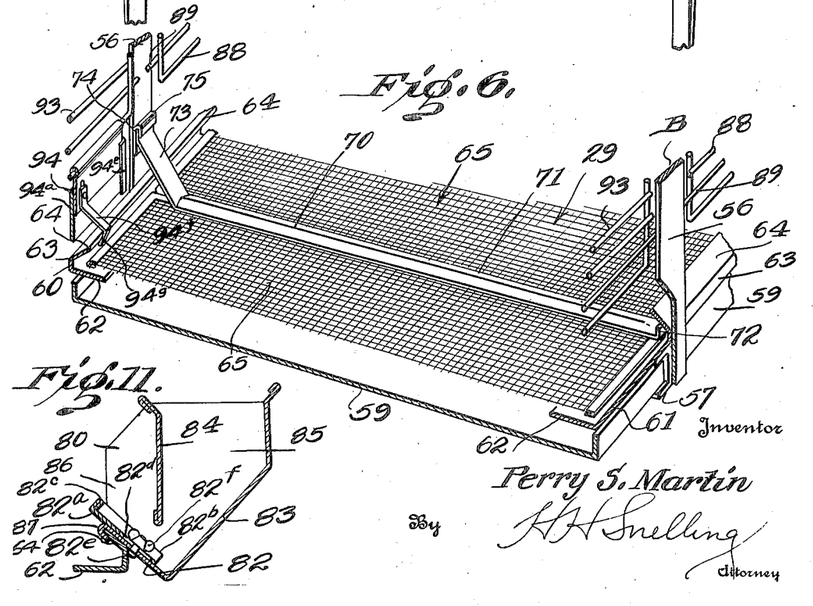
Figure 6 is a detail fragmentary perspective view illustrating the bridge plate between the floor units of a nursery brooder unit and illustrating the novel means employed for holding the bridge plate in position and the floor units in position against accidental displacement.
Figure 11 is an enlarged cross section through a feed hopper taken on the line 5—5 of Figure 3.
Figure 7:
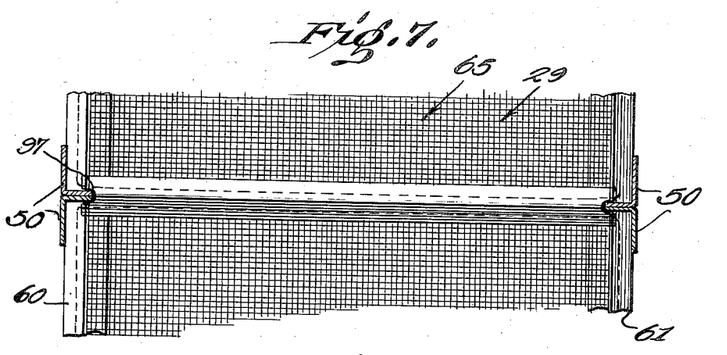
Figure 7 is a detail horizontal section taken on the line 7—7 of Figure 4 looking in the direction of the arrows illustrating the means employed for connecting a brooder unit of one stack with the adjacent brooder unit of another stack.
Figure 8:
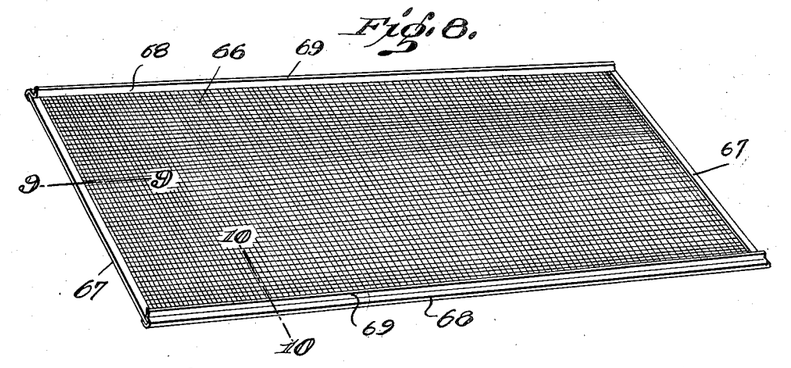
Figure 8 is a detail perspective view of one of the removable floor units for the nursery brooder.
Figure 9:
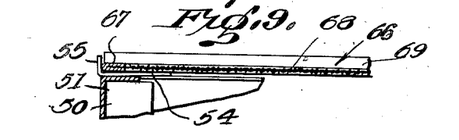
Figure 9 is a detail section taken on the line 9—9 of Figure 8 showing the construction of the floor and illustrating the position of rests of the floor units on one of the channel iron frame members of the brooder units.
Figure 10:
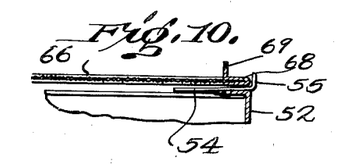
Figure 10 is a detail section taken on the line 10—10 of Figure 8 showing the construction of the floor units and the position of the same when resting on one of the frame members of the brooder units.

As heretobefore stated, the brooder units 29 are placed one upon the other to provide the tiers 28 and each tier contains two stacks of the brooder units with the inner ends of the stacks placed in abutting relation as clearly shown in Figures 4 and 5 of the drawings. The adjacent ends of the brooder sections 29 in the different stacks are held together by transversely extending bridge plates 96 which span the floor section 65 and allow the chicks to go from one unit to the other. The ends of the bridge plates 96 are notched as at 97 for locking engagement with the inwardly extending flanges of the corner standards 50.

In use of my improved brooder house and brooder units, the house is heated at the rear thereof and in the room portion 35 by the radiators 40 and the cool air flows into the room portions 34 through the air inlet ports 45. As the air enters the room portions 34 and is spread over the floor thereof, by an adjustable scattering damper 46' and 46ᵇ, the air remains on the floor below the brooding units until it is drawn to the room portions 35 by the radiator 40 whereby the same will be heated and pass upwardly in the rear end of the brooder unit to the ceiling where the same passes forwardly to a curtain 33, at which point the air is slightly cooled which will cause the same to pass downwardly to the floor again thus completing circulation through the room portion 35 of the brooder room.

It is apparent that as the air is circulated the warm air in the brooding zone of the room will circulate through and around the brooding units. The thermostatically controlled damper 48 is adjusted to permit part of the hot air adjacent to the ceiling to escape through the outlet passageway 47. In general practice this thermostatically controlled damper and the thermostatic controlled valves 41ᵃ are adjusted so as to obtain approximately 85° of temperature at the brooding zone of the room portion 35 of the brooding room, and it has been found that the temperature around all of the brooding units in the brooding zone of the room portion 35 of the brooder room does not vary more than 2 or 3 degrees.

The room portion 34 of the brooder room depends on the heated air which passes through the brooder units and the heat passing through the canvas curtain 33 to heat the same, thus it can be seen that cool air enters the inlet opening 45 therein and will be scattered by the adjustable damper 46' and 46ᵇ over the floor where the same remains until sufficiently heated to pass upwardly. As the heat is arranged adjacent to the canvas curtain the air will pass upwardly at such point to the ceiling where the same will pass forwardly to the front wall of the brooder house and then pass downwardly to the floor due to the cool condition at the wall. During the heating of the air while passing upwardly the same circulates freely through and around brooder units. It has been found desirable to keep the temperature of the brooding zone of this room portion around 70 degrees, which temperature can be regulated by the thermostatically controlled damper 48, and in general practice it has been found that the temperature of the brooding zone does not vary more than 5 to 7 degrees.

It can therefore be seen that the brooding units are arranged with respect to the ventilating and heating of my brooder house in order to obtain uniform and desired temperature zones in the room portions 34 and 35.

It is to be noted that each room portion has independent means for controlling the flow of air therefrom and consequently independent means for controlling the heating thereof. When chicks are first hatched they are placed in the units in the warm room portions 35 and are kept there for a few days by closing the doors 77 between the tiers 28 and 29. After such time the doors 77 are raised and the chicks allowed to occupy increasingly greater portions of the next tier as the chicks grow. It is sometimes found desirable to first place chicks in the upper decks of brooding units in the warm room portions 35 in order to give them the best light and the benefit of the slight variation of heat. As the chicks grow older the same can be placed in the lower decks where the same remain until they are approximately four weeks when they should be removed.

As above stated the chicks may be permitted to enter the portion 34 after they are four days old and after such period they can select the temperature they desire as they have access to both room portions 34 and 35.

In view of my construction of brooder units, the chicks can be dropped from one brooder unit to a lower brooder unit by removing certain of the floor sections 65 and thus for instance the floor section 65 at one end of the top unit can be removed and a gate of some kind can be inserted in the unit adjacent to the opposite end and then gradually moved toward the end of the unit having the floor removed and the chicks will be crowded off the remaining floor sections into the unit below the same.

By having the feed hoppers and water troughs detachably carried by the walls of the brooder units the same may be conveniently removed for permitting access to the interior of the units. I also provide hoppers and troughs having main supply portions and adjustable feeding portions which provide the maximum amount of feeding and drinking areas.

It is to be also noted that the attendant can readily go down the aisles 30 and remove droppings pans 59 to clean the same and to also fill the water and feed troughs, thus rendering the entire brooder easy to handle and take care of.

It can also be seen that I provide a maximum amount of brooding space in a minimum space or given area and if preferred the floor 24 can be utilized for older and more matured chicks.

The position of the brooder units is ideal for the chicks in that the units are spaced from the floor and consequently the cool strata of air around the same, and spaced from the ceiling of the building and consequently the hot strata of air, leaving the brooder units in a position for obtaining a warm clean atmosphere.

Figure 14:
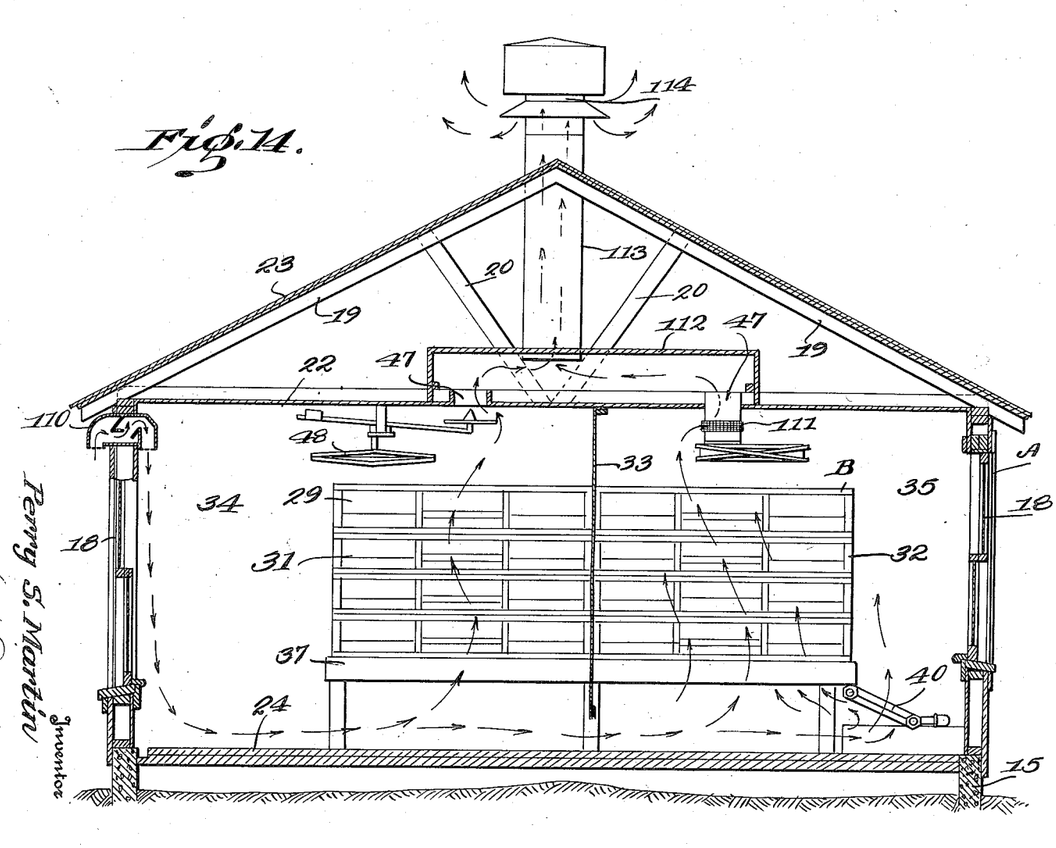
Figure 14 is a vertical transverse section through the brooder house, showing a modified form for ventilating and heating the house.

In Figure 14, I have shown a modified form of brooder house, the same being constructed substantially the same as that shown in the other form of the invention, having a foundation 15; front, rear, and end walls; windows 18 in the front and rear walls; ceiling 22; roof 23; floor 24; and radiators 40 in the rooms 25 adjacent the rear walls.

The brooder units 29 are arranged in the same manner in this form of invention, having the two stacks of units 31 and 32 divided by the canvas curtain 33 for providing room portions 34 and 35 of different temperatures.

Air intakes 110 are arranged in the front walls of the rooms 25 near the ceilings 22 between the windows 18 for permitting the entrance of cool fresh air into the room portions 34. The air passes downwardly in the direction of the arrows towards the floor 24 to a point substantially the same as the entrance of air in the other form of invention. This is due to the position of the windows in the front walls. After the air passes this point the same circulates over the floor of both room portions 34 and 35 until the same is heated and then circulates through and around the brooding units and out through the outlets 47 in the ceilings of the room portions 34 and 35. In room portion 34 the outlet is provided with a damper which is connected to be controlled by a thermostat 48 preferably of the type described in my Patent No. 1,683,908. In room portion 35 the outlet is provided with a downwardly extending vent pipe which has mesh covered ports 111 and is closed at the bottom by a cup-like member (not shown) which member is adapted to be moved up and down in the pipe by the X-shaped thermostat shown secured to the bottom thereof, and thus is adapted to control the opening of the ports 111 in a well known manner. This is a common type of vent control that may be replaced by any known kind without affecting the operation of my system to any appreciable extent. The X-shaped thermostat is also of the general type described in said patent and differs therefrom only in the X-arrangement of the arms; no claim is made to the specific type of thermostat or vent pipe control. Both outlets 47 open into a box-like casing 112 above the ceiling 22, which has connected therewith a stack 113 extending through the roof 23 and has on its upper end a ventilator 114.

From the arrows showing the circulation of air it can be seen that the same is substantially the same in both forms of the invention, the only difference being that air in one form is admitted through the floor in the room portion 34, while in the other form the same is admitted through the upper portion of the front wall of the room portion 34 and passes downwardly to the floor prior to circulating through the brooder units.

Changes in details may be made without departing from the spirit or the scope of my invention, but:

What I claim as new is:

1. In a brooder house, a room including separate room portions opening into each other along the floor, brooder units in said room each unit extending into both portions, heating means in one portion only, and means for independently ventilating the room portions for controlling the heat therein.

2. In a brooder house, a room including separate room portions opening into each other along the floor, spaced parallel tiers of brooder units in said room extending into both room portions, heating means in one room portion only, the room portions having communication with one another through said tiers of brooder units, an air inlet for one room portion, and independent thermostatic control means for the outlet of air from each room portion.

3. A brooder house comprising a plurality of rooms, a plurality of tiers of brooder units arranged in each room, means for heating each room from one end thereof, said heating means extending at right angles to the tiers and disposed at one end thereof and below the same, each tier including a front and a rear stack of brooder units with their ends in abutting relation, and means for preventing the chicks from going from one unit in one stack to an adjacent unit in the other stack, said means also preventing excessive circulation of air from the heated end of the units to the unheated end.

4. A brooder house comprising a plurality of rooms, a plurality of tiers of brooder units arranged in each room, and means for heating each room from one end thereof, said heating means being arranged at right angles to the tiers and disposed at one end of the same and below the tiers, each tier including a front and a rear stack of brooder units with their ends in abutting relation, and means including swinging doors for preventing the chicks from going from one unit in one stack to the adjacent unit in the other stack, said means being removable.

5. A brooder house comprising a plurality of rooms, a plurality of tiers of brooder units arranged in each room, means for heating each room from one end thereof, said heating means being arranged at right angles to the tiers and disposed at one end of the same and below the tiers, each tier including a front and a rear stack of brooder units with their inner ends in abutting relation, removable means for preventing the chicks from going from one unit in one stack to an adjacent unit in the other stack, said tiers being spaced to form aisles, and curtains arranged vertically in said aisles between the tiers and at the meeting point of the stacks in the tiers to form room portions of different temperatures.

6. A brooder house comprising a plurality of rooms, a plurality of tiers of brooder units arranged in each room, means for heating each room from one end thereof, said heating means extending at right angles to the tiers and disposed at one end of the same and below the tiers, each tier including a front and a rear stack of brooder units with their inner ends in abutting relation, means for preventing the chicks from going from one unit in one stack to an adjacent unit in the other stack, said tiers of brooder units being spaced to form aisles, curtains arranged vertically in said aisles between the tiers adjacent to the meeting point of the stacks in the tiers to form room portions of different temperatures, and means for independently ventilating the room portions, said preventing means being removable whereby the ventilation is increased at the same time that the chicks are allowed to go from one unit to another.

7. In a brooder house, a room, a plurality of tiers of brooder units arranged in the room, means for heating the room from one end thereof, said heating means being arranged at right angles to the tiers and disposed at one end of the tiers and below the same, each tier including a front and a rear stack of brooder units with their inner ends in abutting relation, means for preventing the chicks from going from one unit in one stack to the adjacent unit in the other stack, said preventing means being mounted for opening movement to permit passage of the chicks, said tiers being spaced to form aisles, vertically disposed curtains arranged in the aisles between the tiers at the point of connection of the stacks in the tiers to form room portions, the room portions being in atmospheric communication by said tiers, and means for independently ventilating the room portions.

8. In a brooder house, a room, a plurality of tiers of brooder units arranged in the room, means for heating the room from one end thereof, said heating means extending at right angles to the tiers and below the same, each tier including a front and a rear stack of brooder units with their inner ends in abutting relation, means for preventing chicks from going from one unit in one stack to an adjacent unit in the other stack, said last means being hinged so as to swing out of the way to permit passage of the chicks, said tiers being spaced to form aisles, curtains arranged in said aisles between the tiers at the point of connection of one stack with the other, independent air intake passages in each room portion, and independent thermostatic control air outlet passages in each room portion.

9. In a brooder house, a room, a plurality of tiers of brooder units arranged in the room, means for heating the room from one end thereof, said heating means extending at right angles to the tiers and disposed at one end of the tiers and below the same, each tier including a front and a rear stack of brooder units with their inner ends in abutting relation, hinged closure means for preventing chicks from going from one unit in one stack to an adjacent unit in the other stack, said tiers being spaced to form aisles, curtains in said aisles between the tiers at the point of connection of the stacks with one another forming independent room portions, independent air inlets for each room portion below the tiers, and independent air outlets in each room portion intermediate the tiers and above the same, and thermostatic means operating independently of one another for controlling the flow of air through said air outlets.

10. In a brooder house, a room including separate room portions, a plurality of rows of tiers of brooder units in said room extending into both room portions, heating means in one room portion only, and means for independently ventilating the room portions for controlling the heat therein, said tiers being spaced from the floor and ceiling of said room, the space above being divided but the space below being open to both room portions.

11. In a brooder house, a room including separate room portions, brooder units in said room extending into both room portions, heating means in one room portion only, an independent means for ventilating the room portions for controlling the heat therein, said brooder units being spaced from the floor and ceiling of the room and the walls thereof, the space above being divided but the space below being open to both room portions.

12. A brooder house including a room having independent room portions, heating means in one room portion only, spaced parallel rows of tiers of brooder units in said room extending into both room portions, each tier of brooder units including front and rear stacks with the brooder units in abutting relation, the inner ends of said brooder units being provided with doors for preventing the chicks from going from one brooder unit in one stack into the adjacent brooder unit of another stack, and bridge plates connecting the units of one stack to the units of another stack and forming walkways for the chicks from one unit to the other.

13. A brooder house including a room having separate room portions, of different temperatures, spaced parallel tiers of brooder units arranged in the room and extending into both room portions, the tiers including front and rear stacks of brooder units arranged with their inner ends in abutting relation, each brooder unit including removable floor sections to permit the chicks in an upper brooder unit to be dropped into a lower brooder unit, and removable bridge plates connecting the units of the stacks together and engaging said floor sections to hold the same in position against movement and forming walkways for the chicks from one unit of one stack into the adjacent unit of another stack.

14. In a brooder house including a room having separate room portions, brooder units arranged one above the other in spaced parallel tiers, heating means in one room portion only, each tier of brooder units including front and rear stacks being arranged with their inner ends in abutting relation and one stack being arranged in one room portion and the other stack in the other room portion, each brooder unit including corner angle iron standards and longitudinally extending reinforcing beams, removable floor sections seated on said beams for permitting the chicks of one brooder unit to be dropped into a brooder unit below the same, and a bridge strip for connecting said units in one stack with the brooder units of the other stack having its terminals notched for receiving the flanges of the corner standards and engaging the floor sections to hold the same in position against accidental movement and forming walkways for permitting the chicks to enter from one brooder unit of one stack into the adjacent brooder unit of the other stack.

15. A brooder house including a room having separate room portions of different temperatures, spaced parallel rows of tiers of brooder units arranged in superposed relation, each tier including front and rear stacks of brooder units with their inner ends in abutting relation and having one stack arranged in one room portion and the other stack in another room portion, heating means in one room portion only, floor sections arranged in each brooder unit, dropping pans arranged below the floor sections, the floor sections being formed of foraminous material, said floor sections and pans being removable to permit the dropping of the chicks from one brooder unit to an adjacent brooder unit below the same, and a removable bridge strip for engaging the adjacent brooder units of the stacks together.

16. In a brooder, a brooder unit comprising corner angle iron standards, intermediate side plates, transversely extending channel beams connecting the corner standards together, pairs of abutting channel beams connecting the intermediate plates together, longitudinally extending supporting beams connecting the corner standards, the plates and the channel beams together, said channel beams being arranged below the longitudinal beams, independent floor sections resting upon said channel beams and formed of foraminous material, and removable tray sections slidable in the flanges of the channel beams and arranged below the removable floor sections to receive the droppings from the chickens therefrom.

17. In a brooder, a brooder unit including longitudinally extending supporting beams having a relatively wide horizontally disposed base flange and an upwardly and inwardly inclined relatively narrow top flange, independent foraminous floor sections arranged between said flanges and resting on the base flange, intermediate upright members, bridge plates engaging the floor sections at their points of connection having a foot on one end for engaging the flange of one longitudinal supporting beam and an arm on its other end, and a clip for detachably receiving said arm for holding the bridge strip in contact with said floor sections.

18. In a brooder, a brooder unit including longitudinally extending supporting beams including a relatively wide horizontally disposed base flange and an upwardly inclined top flange, removable floor sections received between the flanges and resting upon the base flange, and a trough having an inclined inner wall for engaging the upwardly and inwardly inclined flange of one of the supporting beams, and means carried by said trough for hooking over said flange.

19. In a brooder, a brooder unit comprising longitudinally extending supporting beams adjacent to the lower end thereof including relatively wide base flanges and inwardly and upwardly inclined top flanges, removable foraminous floor sections fitted between said flanges and resting upon the base flanges, said floor sections being of less width than the distance between said beams at the point of connection of said flanges, a removable water trough having an inclined inner wall for resting upon the inclined flange of one supporting beam, means carried by the trough for engaging said flange, a swinging grate forming the side wall of the brooder having a gate carried by the lower end thereof for extending into the trough, and means on said gate for adjusting the position thereof with respect to the trough to hold the gate in different adjusted positions.

20. In a brooder, a brooder unit including longitudinally extending supporting beams, the beams having inwardly and upwardly inclined top flanges, a trough having an inclined inner wall resting upon one of said flanges, hooks carried by said inclined wall for engaging the top of said flange, swinging grates forming the side walls of the units one of said grates being arranged above said trough, and a gate carried by the grate above said trough for extending into the same.

21. In a brooder, a brooder unit including longitudinally extending supporting beams, the beams having inwardly and upwardly inclined top flanges, a trough having an inclined inner wall resting upon one of said flanges, hooks carried by said inclined wall for engaging said one flange, swinging grates forming the side walls of the units arranged above each inclined flange, and a gate carried by the grate above the trough for extending into the same, and means carried by said grates for limiting the outward swinging movement of the grates.

22. In a brooder, a brooder unit comprising vertical corner standards of angle iron, longitudinally extending and transversely extending upper angle irons connecting the standards together, transversely extending channel irons secured to the lower ends of the standards, longitudinally extending lower supporting beams connected to the standard and including inwardly directed relatively wide horizontally disposed base flanges and upwardly and inwardly inclined relatively narrow top flanges, pairs of abutting channel beams secured to the longitudinally extending supporting beams and arranged below the same, removable foraminous bottom wall sections resting upon the bottom flanges of the supporting beams, and removable dropping troughs slidably mounted in the flanges of the transversely extending channel beams, and a removable trough having an inwardly inclined inner wall resting upon and detachably connected with one of the inclined flanges of the bottom longitudinally extending supporting beams.

23. In a brooder, a brooder unit having a foraminous end wall at its outer portion, and hinged doors at its inner end portion, and removable foraminous bottom wall sections arranged below said doors, and bridging and holding means between said sections.

PERRY S. MARTIN.